United States Patent
Egiziano et al.

(10) Patent No.: US 8,829,721 B2
(45) Date of Patent: Sep. 9, 2014

(54) CONTROLLER APPARATUS WITH MAXIMUM POWER POINT TRACKING FOR CONTROLLING AN ELECTRIC POWER GENERATION SYSTEM BASED ON PHOTOVOLTAIC SOURCES, CONTROLLING METHOD AND RELATED ELECTRIC POWER GENERATION SYSTEM

(75) Inventors: Luigi Egiziano, Naples (IT); Nicola Femia, Baronissi (IT); Giovanni Pertrone, Castel San Giorgio (IT); Giovanni Spagnuolo, Salerno (IT); Massimo Vitelli, Caserta (IT)

(73) Assignee: Universita' Degli Studi di Salerno, Fisciano (SA) (IT)

( * ) Notice: Subject to any disclaimer, the term of this patent is extended or adjusted under 35 U.S.C. 154(b) by 535 days.

(21) Appl. No.: 13/266,073

(22) PCT Filed: Apr. 19, 2010

(86) PCT No.: PCT/IT2010/000167
§ 371 (c)(1),
(2), (4) Date: Oct. 24, 2011

(87) PCT Pub. No.: WO2010/122589
PCT Pub. Date: Oct. 28, 2010

(65) Prior Publication Data
US 2012/0038217 A1 Feb. 16, 2012

(30) Foreign Application Priority Data
Apr. 24, 2009 (IT) .............................. RM2009A0193

(51) Int. Cl.
*H02J 3/00* (2006.01)
(52) U.S. Cl.
USPC .......................................................... 307/82

(58) Field of Classification Search
USPC ........................................................... 307/82
See application file for complete search history.

(56) References Cited

U.S. PATENT DOCUMENTS

2008/0143188 A1 6/2008 Adest et al.

OTHER PUBLICATIONS

"Dynamic Multiphysics Model for Solar Array", Shengyi Liu et al., IEEE Transactions on Energy Conversion, vol. 17, No. 2, Jun. 2002, pp. 285-294.
"Short-Current Pulse-Based Maximum-Power-Point Tracking Method for Multiple Photovoltaic-and-Converter Module System", Toshihiko Noguchi et al., Transactions on Industrial Electronics, vol. 49, No. 1, Feb. 2002, pp. 217-223.
"Implementation of a DSP-Controlled Photovoltaic System with Peak Power Tracking" IEEE Transactions on Industrial Electronics, vol. 45, No. 1, Feb. 1998, pp. 99-107.

(Continued)

*Primary Examiner* — Robert L. Deberadinis
(74) *Attorney, Agent, or Firm* — Abe Hershkovitz; Hershkovitz & Associates, PLLC

(57) ABSTRACT

Controller apparatus with MPPT tracking for controlling an electric power generation system comprising two identical sub-sections of a photovoltaic field, connected to two respective identical switching power converters, the two converters being controlled by two respective periodic controlling signals and the outputs of the two converters being connected in parallel. The controller apparatus comprises a first and a second current sensor for detecting the output currents of the two converters, a subtractor capable to receive the two current detection signals and to generate a difference signal, an amplifier capable to amplify the difference signal by a constant gain k, and a low-pass filter capable to filter the amplified difference signal, a proportional-integral controller for controlling the filtered amplified difference signal.

19 Claims, 9 Drawing Sheets

(56) References Cited

OTHER PUBLICATIONS

"A Method for MPPT Control While Searching for Parameters Corresponding to Weather Conditions for PV Generation Systems", Nobuyoshi Mutoh, et al., IEEE Transactions on Industrial Electronics, vol. 53, No. 4, Aug. 2006, pp. 1055-1065.

"A Control Method to Charge Series-Connected Ultraelectric Double-Layer Capacitors Suitable for Photovoltaic Generation Systems Combining MPPT Control Method", Nobuyoshi Mutoh, et al., IEEE Transactions on Industrial Electronics, vol. 54, No. 1, Feb. 2007, pp. 374-383.

"A Fuzzy-Logic-Controlled Single-Stage Converter for PV-Powered Lighting System Applications", Tsai-Fu Wu, et al., IEEE Transactions on Industrial Electronics, vol. 47, o.2, Apr. 2000, pp. 287-296.

"Neural-Network-Based Maximum-Power-Point Tracking of Coupled-Inductor Interleaved-Boost-Converter-Supplied PV System Using Fuzzy Controller", Mummadi Veerachary, et al., IEEE Transactions on Industrial Electronics, vol. 50, No. 4, Aug. 2003, pp. 749-758.

"New Maximum Power Point Tracker Using Sliding-Mode Observer for Estimation of Solar Array Current in the Grid-Connected Photovoltaic System", Il-Song Kim, et al., IEEE Transactions on Industrial Electronics, vol. 53, No. 4, Aug. 2006, pp. 1027-1035.

"Intelligent PV Module for Grid-Connected PV Systems", Eduardo Roman, et al., IEEE Transactions on Industrial Electronics, vol. 53, No. 4, Aug. 2006, pp. 1066-1073.

"Photovoltaic Power Conditioning System With Line Connection", Jung-Min Kwon, et al., IEEE Transactions on Industrial Electronics, vol. 53, No. 4, Aug. 2006, pp. 1048-1054.

"Application of Centered Differentiation and Steepest Descent to Maximum Power Point Tracking", Weidong Xiao, et al., IEEE Transactions on Industrial Electronics, vol. 54, No. 5, Oct. 2007, pp. 2539-2549.

"A Maximum Power Point Tracking System with Parallel Connection for PV Stand-Alone Applications", Roger Gules, et al., IEEE Transactions on Industrial Electronics, vol. 55, No. 7, Jul. 2008, pp. 2674-2683.

"Voltage-Based Maximum Power Point Tracking Control of PV System", Mummadi Veerachary, et al, IEEE Transactions on Aerospace and Electronic Systems, vol. 38, No. 1, Jan. 2002, pp. 262-270.

"Development of a Microcontroller-Based Photovoltaic Maximum Power Point Tracking Control System", Eftichios Koutroulis, et al., IEEE Transactions on Power Electronics, vol. 16, No. 1, pp. 46-54.

"Optimization of Perturb and Observe Maximum Power Point Tracking Method", Nicola Femia, et al., IEEE Transactions on Power Electronics, vol. 20, No. 4, Jul. 2005, pp. 963-973.

"Predictive & Adaptive MPPT Perturb and Observe Method", N. Femia et al., IEEE Transactions on Aerospace and Electronic Systems, vol. 43, No. 3, Jul. 2007, pp. 934-950.

"Reliability Issues in Photovoltaic Power Processing Systems", Giovanni Petrone, et al., IEEE Transactions on Industrial Electronics, vol. 55, No. 7, Jul. 2008, pp. 2569-2580.

"Distributed Maximum Power Point Tracking of Photovoltaic Arrays: Novel Approach and System Analysis", Nicola Femia, et al., IEEE Transactions on Industrial Electronics, vol. 55, No. 7, Jul. 2008, pp. 2610-2621.

"Comparison of Photovoltaic Array Maximum Power Point Tracking Techniques" IEEE Transaction of Energy Conversion, vol. 32, No. 2, Jun. 2007, pp. 439-449.

"Hysteresis Current Control and Sensorless MPPT for Grid-Connected Photovoltaic Systems", Nasrudin Abd Rahim, et al., Dept. of Electrical Engineering, University of Malaya Kuala Lumpur, Malaysia, pp. 572-577.

International Search Report issued in PCT application No. PCT/IT2010/000167, dated Aug. 24, 2010.

a)

b)

a)

b)

a)

b)

a)

b)

CONTROLLER APPARATUS WITH MAXIMUM POWER POINT TRACKING FOR CONTROLLING AN ELECTRIC POWER GENERATION SYSTEM BASED ON PHOTOVOLTAIC SOURCES, CONTROLLING METHOD AND RELATED ELECTRIC POWER GENERATION SYSTEM

FIELD OF THE INVENTION

The present invention relates to a controller apparatus with maximum power point tracking (or MPPT) for controlling an electric power generation system based on photovoltaic sources, which is dynamically adaptive to instantaneous environmental conditions and very simple to implement, also through purely analog electronics, the apparatus being reliable, efficient, precise, and inexpensive, optimising performance of the whole system.

The present invention further relates to the controlling method and the related electric power generation system.

BACKGROUND OF THE INVENTION

It is known that the improvement of energy productivity is one of the main question in photovoltaic systems which are both stand-alone and connected to an electric energy distribution network (or grid connected). In this context, MPPT technique plays an important role since, when correctly designed, it allows to maximise the output power of the photovoltaic field by continuously tracking the maximum power point that depends on the temperature of the photovoltaic modules and on the solar radiation conditions, as described by S. Liu and R. A Dougal in "*Dynamic multiphysics model for solar array*", IEEE Transactions on Energy Conversion, Vol. 17, No. 2, pp. 285-294, June 2002.

The MPPT technique has been treated in many different ways in the prior art. In this regard, examples of implementation in fuzzy logic, with neural networks, with pilot cells, and based on digital signal processors (or DSP) have been proposed by T. Noguchi, S. Togashi and R. Nakamoto in "*Short-current pulse-based maximum-power-point tracking method for multiple photovoltaic-and converter module system*", IEEE Trans. Ind. Electron., vol. 49, no. 1, pp. 217-223, February 2002, by C. Hua, J. Lin, and C. Shen in "*Implementation of a DSP-controlled photovoltaic system with peak power tracking*", IEEE Trans. Ind. Electron., vol. 45, no. 1, pp. 99-107, February 1998, by N. Mutoh, M. Ohno, and T. Inoue in "*A method for MPPT control while searching for parameters corresponding to weather conditions for PV generation systems*", IEEE Trans. Ind. Electron., vol. 53, no. 4, pp. 1055-1065, June 2006, by N. Mutoh and T. Inoue in "*A control method to charge series-connected ultraelectric double-layer capacitors suitable for photovoltaic generation systems combining MPPT control method*", IEEE Trans. Ind. Electron., vol. 54, no. 1, pp. 374-383, February 2007, by T.-F. Wu, C.-H. Chang, and Y.-H. Chen in "*A fuzzy-logic-controlled single-stage converter for PV-powered lighting system applications*", IEEE Trans. Ind. Electron., vol. 47, no. 2, pp. 287-296, April 2000, by M. Veerachary, T. Senjyu, and K. Uezato in "*Neural-network-based maximum-power-point tracking of coupled-inductor interleaved-boost converter-supplied PV system using fuzzy controller*", IEEE Trans. Ind. Electron., vol. 50, no. 4, pp. 749-758, August 2003, by I. S. Kim, M. B. Kim, and M. J. Youn in "*New maximum power point tracker using sliding-mode observer for estimation of solar array current in the grid-connected photovoltaic system*", IEEE Trans. Ind. Electron., vol. 53, no. 4, pp. 1027-1035, June 2006, by E. Roman, R. Alonso, P. Ibanez, S. Elorduizapatarietxe, and D. Goitia in "*Intelligent PV module for grid-connected PV systems*", IEEE Trans. Ind. Electron., vol. 53, no. 4, pp. 1066-1073, June 2006, by J. M. Kwon, K. H. Nam, and B. H. Kwon in "*Photovoltaic power conditioning system with line connection*", IEEE Trans. Ind. Electron., vol. 53, no. 4, pp. 1048-1054, June 2006, by W. Xiao, W. G. Dunford, P. R. Palmer, and A. Capel in "*Application of centered differentiation and steepest descent to maximum power point tracking*", IEEE Trans. Ind. Electron., vol. 54, no. 5, pp. 2539-2549, October 2007, by R. Gules, J. De Pellegrin Pacheco, H. L. Hey, and J. Imhoff: in "*A Maximum Power Point Tracking System With Parallel Connection for PV Stand-Alone Applications*", IEEE Trans. on Industrial Electronics, Vol. 55, No. 7, July 2008, by M. Veerachary, T. Senjyu, and K. Uezato in "*Voltage-based maximum power point tracking control of PV system*", IEEE Trans. Aerosp. Electron. Syst., vol. 38, no. 1, pp. 262-270, January 2002, and by E. Koutroulis, K. Kalaitzakis, and N. Voulgaris in "*Development of a microcontroller-based, photovoltaic maximum power point tracking control system*", IEEE Trans. Power Electron., vol. 16, no. 1, pp. 46-54, January 2001. Also less complex implementations based on the Perturb and Observe technique are widely used, thanks to the fact that, if correctly designed, they may lead to particularly high values of MPPT efficiency, as described by N. Femia, G. Petrone, G. Spagnuolo, and M. Vitelli in "*Optimization of perturb and observe maximum power point tracking method*", IEEE Trans. Power Electron., vol. 20, no. 4, pp. 963-973, July 2005, and by N. Femia, D. Granozio, G. Petrone, G. Spagnuolo, and M. Vitelli in "*A predictive and adaptive MPPT perturb and observe method*", IEEE Trans. Aerosp. Electron. Syst., vol. 43, no. 3, pp. 934-950, July 2007, J. Y. Ahn et al., in "*Dual-module based maximum power point tracking control of PV system*", IEEE Applied Power Electronics Conference and Expostion, Vol. 3, pages 1509-1514, 22 Feb. 2004, [XP010704038] discloses a MPPT method for controlling a dual module PV system wherein two modules, each including a section of photovoltaic field connected to a respective power converter, operate in parallel.

However, any MPPT technique specification presents some particular limitations, mainly due to the complexity of the circuit implementation.

In fact, the latter (almost always based on digital electronics) requires devices for measuring the photovoltaic power, such to allow the execution of operations of multiplication between voltages and currents, and a significant number of sensing devices for sensing many circuit electrical quantities, in particular voltages and currents. Such detections are affected by ineliminable noise components (due to the high frequency switching operation and/or to an inadequate filtering), the overall combination of which causes tracking (based on noisy measures) to be affected by a significant noise as well that renders it not completely precise. Consequently, such techniques may make the system operate in a non maximum power point or, sometimes, they may lead to unstable oscillations of the system, as described by Petrone, G. Spagnuolo, R. Teodorescu, M. Veerachary, and M. Vitelli in "*Reliability Issues in Photovoltaic Power Processing Systems*", IEEE Trans. on Industrial Electronics, Vol. 55, No. 7, pp. 2569-2580, June 2008.

Moreover, the aforementioned complex circuit implementations often require the exclusive use of a specific type of power converters.

Also, in so called grid connected applications, 100 Hz disturbances coming from the network are capable to cause failure of the MPPT techniques (as it occurs for instance for the Perturb and Observe technique).

SUMMARY OF THE INVENTION

It is therefore an object of the present invention to adaptively control an electric power generation system based on photovoltaic sources so as to track the maximum power point of these, that allows to obtain a very high operation efficiency under variations of the environmental conditions, such as, for instance, temperature and sunlight level of the photovoltaic modules, maintaining the system simple, reliable, efficient, and inexpensive to make.

It is also an object of the present invention to carry out such a control in a fast way under variations of the operation environmental conditions, such as temperature and sunlight level of the photovoltaic modules.

It is therefore specific subject matter of the present invention a controller apparatus with maximum power point tracking, or MPPT, for controlling an electric power generation system based on photovoltaic sources, the system comprising two identical sections of a photovoltaic field, connected to two respective identical power converters with direct current input, each converter comprising switching means capable to periodically connect the input to the output of the same converter, the two converters being controlled by two respective periodic signals for controlling the switching means which are generated by the controller apparatus, the outputs of the two converters being connected in parallel, so as to have an identical output voltage, the controller apparatus comprising a first current sensor for detecting an output current of a first one of said two converters, for giving a first current detection signal, and a second current sensor for detecting an output current of a second one of said two converters, for giving a second current detection signal, the controller apparatus being characterised in that it further comprises:

- subtractor means capable to receive said first and second current detection signals and to generate a difference signal between the output current of the first converter and the output current of the second converter,
- amplifier means capable to receive said current difference signal and to amplify the same by a constant gain k, outputting an amplified difference signal,
- low-pass filter means capable to receive and to filter said amplified difference signal, for outputting a filtered amplified difference signal,
- controller means capable to receive said filtered amplified difference signal and to carry out a proportional action and an integral action on the same, for outputting a processed signal vc(t),
- first generator means capable to receive said processed signal vc(t) and to generate a first one of said two controlling periodic signals having an instant duty cycle dB(t) proportional to said processed signal vc(t) by a constant equal to 1/VM, whereby $$dB(t) = \frac{vc(t)}{VM}$$

for outputting said first controlling periodic signal capable to control the second converter,
- adder means capable to receive said processed signal and to add to it a constant displacement having modulus VM*Δd, with Δd ranging from 0 to 1:

$0<\Delta d<1$, for outputting a displaced processed signal, and
- second generator means capable to receive said displaced processed signal and to generate a second one of said two controlling periodic signals having an instant duty cycle dA(t) proportional to said displaced processed signal, for outputting said second controlling periodic signal capable to control the first converter, said constant gain k and said constant displacement having the same sign.

Preferably according to the invention, said constant gain k has modulus equal to 1.

Always according to the invention, said controller means may be further capable to carry out a derivative action on said filtered amplified difference signal.

Still according to the invention, said first generator means may comprise first pulse width modulator (PWM) means, preferably comprising first comparator means having a non-inverting input, capable to receive said processed signal, and an inverting input, capable to receive a periodic signal with sawtooth waveform the peak amplitude of which is VM and it is generated by a corresponding generator, said first comparator means giving said first controlling periodic signal.

Furthermore according to the invention, said second generator means may comprise second pulse width modulator (PWM) means, preferably comprising second comparator means having a non-inverting input, capable to receive said displaced processed signal, and an inverting input, capable to receive a periodic signal with sawtooth waveform the peak amplitude of which is VM and it is generated by a corresponding generator, said second comparator means giving said first controlling periodic signal.

Always according to the invention, the outputs of the two converters may be connected in series, instead of in parallel, so as to have an identical output current, the controller apparatus comprising a first voltage sensor, instead of the first current sensor, for detecting an output voltage, instead of a current, of the first one of said two converters, for giving a first voltage detection signal, and a second voltage sensor, instead of the second current sensor, for detecting an output voltage, instead of a current, of the second one of said two converters, for giving a second voltage detection signal, said subtractor means being capable to receive said first and second voltage detection signals, instead of said first and second current detection signals, and to generate a detected output voltage difference signal, instead of the detected current difference signal, said amplifier means being capable to receive said voltage difference signal, instead of the current difference signal, and to amplify the same by the constant gain k, outputting an amplified difference signal.

It is still specific subject matter of the present invention a controlling method with MPPT tracking for controlling an electric power generation system based on photovoltaic sources, the system comprising two identical sections of a photovoltaic field, connected to two respective identical power converters with direct current input, each converter comprising switching means capable to periodically connect the input to the output of the same converter, the two converters being controlled by two respective periodic signals for controlling the switching means, the outputs of the two converters being connected in parallel, so as to have an identical output voltage, the method comprising the steps of:

A. detecting an output current of a first one of said two converters, obtaining a first current detection signal,
B. detecting an output current of a second one of said two converters, obtaining a second current detection signal, the method being characterised in that it further comprises the following steps:

C. generating a difference signal between the output current of the first converter and the output current of the second converter on the basis of said first and second current detection signals,
D. amplifying said current difference signal by a constant gain k (preferably having modulus equal to 1), obtaining an amplified difference signal,
E. filtering said amplified difference signal, obtaining a filtered amplified difference signal,
F. carrying out a proportional action and an integral action on said filtered amplified difference signal, obtaining a processed signal vc(t),
G. generating a first one of said two controlling periodic signals having an instant duty cycle dB(t) proportional to said processed signal vc(t) by a constant equal to 1/VM, whereby $$dB(t) = \frac{vc(t)}{VM}$$

obtaining said first controlling periodic signal capable to control the second converter,
H. adding to said processed signal a constant displacement having modulus VM*Δd, with Δd ranging from 0 to 1:

$$0 < \Delta d < 1,$$

obtaining a displaced processed signal, and
I. generating a second one of said two controlling periodic signals having an instant duty cycle dA(t) proportional to said displaced processed signal, obtaining said second controlling periodic signal capable to control the first converter,
said constant gain k and said constant displacement having the same sign.

Always according to the invention, step F may further carry out a derivative action on said filtered amplified difference signal.

Still according to the invention, the outputs of the two converters may be connected in series, instead of in parallel, so as to have an identical output current, instead of an identical current, the method detecting in step A an output voltage, instead of a current, of the first one of said two converters, obtaining a first voltage detection signal, the method detecting in step B an output voltage, instead of a current, of the second one of said two converters, obtaining a second voltage detection signal, the method generating in step C a difference signal between the voltages detected in steps A and B, instead of the detected current difference signal, the method amplifying in step D the voltage difference signal, instead of the current difference signal obtaining an amplified difference signal.

It is always specific subject miter of the present invention an electric power generation system comprising two identical sections of a photovoltaic field, connected to two respective identical power converters with direct current input, each converter comprising switching means capable to periodically connect the input to the output of the same converter, the two converters being controlled by two respective periodic signals for controlling the switching means which are generated by a controller apparatus with MPPT tracking, the outputs of the two converters being connected in parallel, so as to have an identical output voltage, characterised in that the controller apparatus is a controller apparatus as previously described in the case of outputs of the converters connected in parallel.

Always according to the invention, the outputs of the two converters may be connected in series, instead of in parallel, so as to have an identical output current, the controller apparatus being a controller apparatus come as previously described in the case of outputs of the converters connected in series.

Still according to the invention, each one of said two identical sections may comprise a photovoltaic module.

Furthermore according to the invention, the system according to the invention may be stand-alone. In this case, said two power converters may have direct current output, said two converters being preferably boost converters, more preferably with continuous conduction operation mode or CCM (Continuous Conduction Mode).

Alternatively according to the invention, the system according to the invention may be connected to an electric energy distribution network (grid connected), said two power converters having alternate current output.

The invention is substantially based on the equalisation of the operating points of output electrical quantities (such as voltage or current) in correspondence with the forced displacement of operating points of (homologous) input electrical quantities of two identical (within the normal manufacturing tolerances) photovoltaic systems each comprising a section of a photovoltaic field connected to a power converter. In particular, in the following of the present description and in the claims it must be understood that "section of a photovoltaic field" also means a single panel or a sub-section of a single panel.

The main advantages obtained through the invention are numerous.

First of all, its circuit implementation is extremely simple, and it may be completely analog, with no need for use of memory units.

Moreover, the invention does not require the measure of photovoltaic power, i.e. it does not require the execution of operations of multiplication of currents by voltages.

Still, the invention only requires detection of output currents (or voltages) of the converters, and maximum power point tracking is based on a minimum number of electrical variables which render the related controller apparatus (and the whole system, as well as the operation method) extremely reliable, since it is less affected by noise components of the measures with respect to the control techniques of the prior art.

Furthermore, the controller apparatus according to the invention may be used with any type of power converter.

Also, efficiency of the electric power generation system according to the invention is very high, since in steady conditions it is not subject to fluctuations of the operating point of the photovoltaic field.

Still, in grid connected applications, the controller apparatus according to the invention is not deceived by 100 Hz disturbances coming from the grid.

Furthermore, the invention may be easily adaptable to the particularly advantageous applications of distributed maximum power point tracking described by N. Femia, G. Lisi, G. Petrone, G. Spagnolo and M. Vitelli in "*Distributed Maximum Power Point Tracking of Photovoltaic Arrays: novel approach and system analysis*", IEEE Transactions on Industrial Electronics, Vol 55, No 7, 2008, pp. 2610-2621.

Moreover, the invention allows to obtain an extremely high velocity of maximum power point tracking under variations of the operating environmental conditions, such as temperature and sunlight level of the photovoltaic modules.

In other words, the invention is simple to make, very flexible, fast in adapting to the variation of the operating conditions, and it ensures a high efficiency.

BRIEF DESCRIPTION OF THE DRAWINGS

The present invention will now be described, by way of illustration and not by way of limitation, according to its preferred embodiments, by particularly referring to the Figures of the enclosed drawings, in which:

FIG. 7 shows the numerical results of simulations on a prior art reference system operating according to the Perturb and Observe technique and comprising a boost converter, wherein FIG. 7a represents the time domain behaviour of the power extracted from the photovoltaic module in stable atmospheric conditions, during boost converter power up transient until steady conditions are reached and FIG. 7b shows the corresponding time domain behaviour of the duty cycle of the boost converter switches;

FIG. 12 shows a comparison of the time domain behaviour of the power extracted from the photovoltaic modules as shown in FIGS. 10a and 11a.

In the Figures, alike elements are indicated by same reference numbers.

DETAILED DESCRIPTION OF THE PREFERRED EMBODIMENTS

In the following, the invention will be illustrated with reference to stand-alone embodiments employing converters with direct current output and direct current input (dc-dc). However, it should be understood that other embodiments of the invention may be used in applications with connections to an electric energy distribution network (or grid connected), employing different types of power converters, e.g. with alternate current output and direct current input (dc-ac), still remaining within the scope of the present invention.

Moreover, in the following of the present description and in the claims, every time that it will be said that two components or sections are identical, it should be understood that they are identical within the normal manufacturing tolerances.

Figure 1:
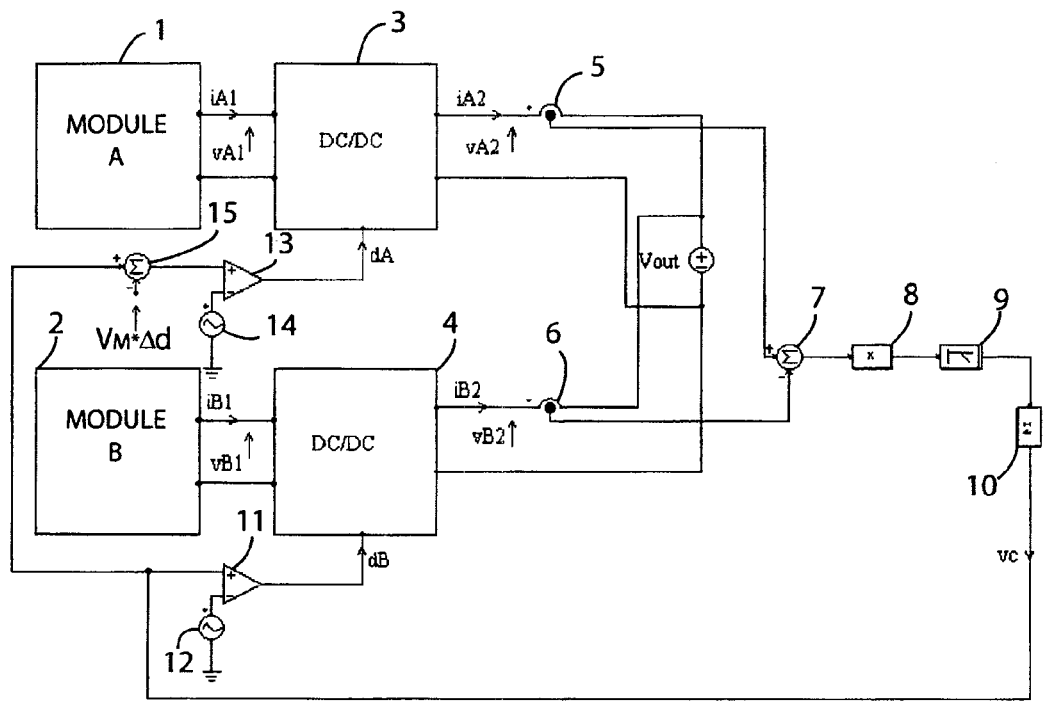
FIG. 1 shows a schematic block diagram of a preferred embodiment of the electric power generation system according to the invention.

With reference to FIG. 1, it may be observed that a preferred embodiment of the electric power generation system according to the invention comprises two identical photovoltaic modules A and B, respectively indicated by reference numbers 1 and 2 (it must be considered that, alternatively, blocks 1 and 2 could represent identical sections of a photovoltaic field, that as said before may also consist of single panels or sub-sections of a single panel). The two modules 1 and 2 operate under the same conditions, i.e. with the same sunlight level S and the same room temperature Tamb. The output of each one of the two modules 1 and 2 is connected to a respective dc-dc converter, respectively 3 and 4. Each converter comprises switching means for connecting the input to the output, generally semiconductor power switches (preferably made through respective MOSFETs or IGBTs). In particular, each converter is controlled by a periodic signal for controlling the switches having an instant duty cycle (i.e. the ratio between the time during which the switches are closed and the period of the periodic signal for controlling the switches) that varies in time (indicated with dA(t) for converter 3 and with dB(t) for converter 4). In the following, each pair (1-3 or 2-4) formed by a photovoltaic module and the respective converter will be also indicated as switching photovoltaic source, respectively A or B.

Output nodes of the two converters 3 and 4 are connected in parallel. This entails that the two switching photovoltaic sources A and B have the same value of the output voltage Vout (e.g., given to a load not shown in FIG. 1):

$$vA2 = vB2 = Vout$$

Figure 2:
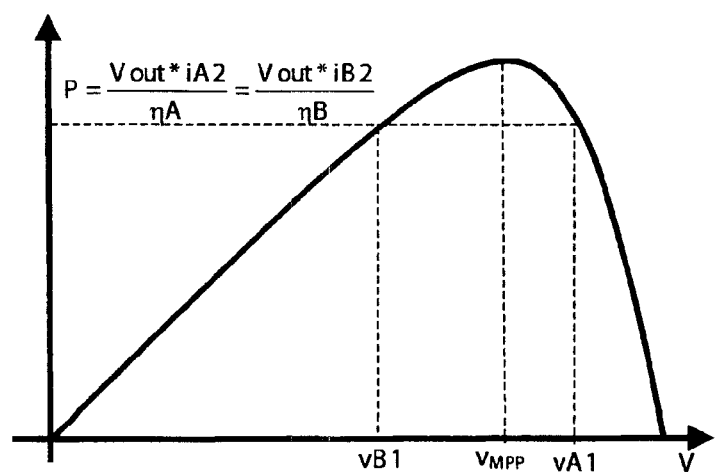
FIG. 2 shows two possible respective operating points on the power-voltage characteristic of the two photovoltaic modules of the system of FIG. 1.

As a consequence, if the values of the output currents iA2 and iB2 are controlled so that they are equal (iA2=iB2), then the powers provided by the two switching photovoltaic sources A and B assume the same value. Therefore, also the power P extracted from the two photovoltaic modules 1 and 2, i.e. the power at the input of the two dc-dc converters 3 and 4, must assume the same value:

$$P = \frac{Vout * iA2}{\eta A} = \frac{Vout * iB2}{\eta B}$$

where $\eta A$ and $\eta B$ are the efficiencies of the power stages of the two dc-dc converters 3 and 4, respectively (given the equality of the characteristics of these, it is $\eta A = \eta B$). This only occurs in one of the two following cases:

when the operating voltages vA1 and vB1 of the two photovoltaic modules 1 and 2 assume the same value; or when the operating voltages vA1 and vB1 of the two photovoltaic modules 1 and 2, as shown in FIG. 2, are located on opposite sides of the power-voltage characteristic of the two modules 1 and 2 with respect to the voltage $v_{MPP}$ corresponding to the maximum power point of these.

As it will be explained later, the controller apparatus according to the invention is capable to just give rise to the operation condition shown in FIG. 2.

The output currents iA2 and iB2 of the two dc-dc converters 3 and 4 are detected by two current sensors, respectively 5 and 6, and the detected values of the currents iA2 and iB2 are sent to a subtractor device 7 giving a difference signal (iA2−iB2) to an amplifier 8 having constant gain k equal to (−1) (in other words, the amplifier 8 operates as inverter for the input signal). In particular, the output signal of the amplifier 8

$$k(iA2-iB2)$$

is deprived of the high frequency components, due to the switching of the converters 3 and 4, through the low-pass filter 9. The output signal of the low-pass filter 9 is, hence, equal to $$k*(<iA2>-<iB2>)$$

where the variables between angle brackets (i.e. <iA2> and <iB2>) represent the low frequency content of the corresponding output current signals iA2 and iB2 of the converters 3 and 4.

Finally, the output signal of the low-pass filter 9 is sent to a Proportional-Integral (or PI) controller 10, the output signal vc(t) of which is sent to a first pulse width (PWM) modulator that generates the periodic signal for controlling the converter 4 having instant duty cycle dB(t), so that the pulse width of the controlling signal (and, consequently, the instant duty cycle dB(t)) is proportional to the value of the signal vc(t). In particular, the first modulator is made through a comparator 11 at the non-inverting input of which the output signal vc(t) of the PI controller 10 is present and at the inverting input of which a periodic signal sB(t) with sawtooth waveform the peak amplitude of which is VM (with period equal to the switching period of the switches of the converter 4) is present, coming from a suitable generator 12, whereby the duty cycle dB(t) of the switches of the converter 4 is equal to $$dB(t) = \frac{vc(t)}{VM} \quad [1]$$

A second modulator PWM generates the periodic signal for controlling the converter 3 having instant duty cycle dA(t). Also the second modulator is made through a comparator 13 at the inverting input of which a periodic signal sA(t) with sawtooth waveform the peak amplitude of which is VM (with period equal to the switching period of the switches of the converter 3, identical to the switching period of the converter 4) is present, coming from a suitable generator 14; in particular, the signals sA(t) and sB(t) could come from a sole generator. At the non-inverting input of the comparator 13 a difference signal between the output signal vc(t) of the PI controller 10 and a constant value (VM*Δd), where 0<Δd<1, coming from a subtractor device 15, is present; i.e. at the non-inverting input of the comparator 13 a signal equal to (vc(t)−VM*Δd) is present. In other words, at the non-inverting input of the comparator 13 the signal vc(t) to which cui a negative constant displacement $$Displacement=-VM*\Delta d$$

has been added is present. This implies that the duty cycle dA(t) of the switches of the converter 3 is equal to $$dA(t)=dB(t)-\Delta d \quad [2]$$

In particular, the constant value Δd (i.e. the modulus of the constant displacement Displacement) ranges from 0 to 1 (0<Δd<1).

Presence of the PI controller 10 ensures that its input signal tends to have a dc value equal to zero, i.e.:

$$k*(<iA2>-<iB2>)|_{DC}=0 \quad [3]$$

This implies that the dc values of the two output currents of the converters 3 and 4 tend to be equal:

$$<iA2>=<iB2> \quad [4]$$

By indicating with M(d) the conversion ratio between the output voltage and the input voltage of the converters 3 and 4 (identical to each other), where d is the duty cycle of the switches of these, the input voltages vA1 and vB1 of the converters 3 and 4 are equal to:

$$vA1=Vout/M(dA) \quad [5]$$

$$vB1=Vout/M(dB) \quad [6]$$

The choice of the type of the converters 3 and 4 is completely unbound. Obviously, the used type must be capable to provide the appropriate values of the conversion ratios M(d) of the voltages on the basis of the levels of the input and output voltages of the specific application under consideration. In the following, without loss of generality, it is assumed that the output voltage Vout is always higher than the input voltages vA1 and vB1 (i.e., Vout>vA1 and Vout>vB1), and reference is made to the voltage step-up, or boost, type of converters in continuous conduction operation mode, or CCM (Continuous Conduction Mode). In this case, it is:

$$M(d) = \frac{1}{1-d} \quad [7]$$

Since dA(t) is always smaller than dB(t) (see equation [2]), equation [7] demonstrates that M(dA(t)) is always smaller than M(dB(t)), and consequently from equations [5] and [6] it is $$vA1>vB1 \quad [8]$$

Figure 3:
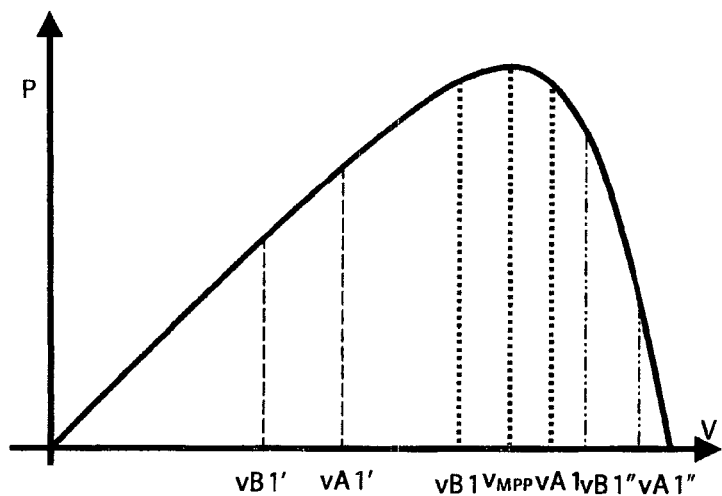
FIG. 3 shows three possible pairs of respective operating points on the power-voltage characteristic of the two photovoltaic modules of the system of FIG. 1.

In these conditions, the three situations shown in FIG. 3 with reference to the power-voltage characteristic of the photovoltaic modules 1 and 2 may occur.

The first situation is when both the operating points of the two photovoltaic modules 1 and 2, respectively giving the voltages vA1=vA1' and vB1=vB1', are located on the left of the maximum power point, corresponding to the voltage $v_{MPP}$, whereby vB1'<vA1'<$v_{MPP}$.

The second situation is when both the operating points of the two photovoltaic modules 1 and 2, respectively giving the voltages vA1=vA1" and vB1=vB1", are located on the right of the maximum power point, whereby $v_{MPP}$<vB1"<vA1".

The third situation is when the operating points of the two photovoltaic modules 1 and 2, respectively giving the voltages vA1 and vB1, are located on opposite sides of the power-voltage characteristic of the two modules 1 and 2 with respect to the maximum power point, whereby vB1<$v_{MPP}$<vA1.

In the case of the first situation (vB1'<vA1'<$v_{MPP}$), power $P_A$ extracted from the module 1 is higher than power $P_B$ extracted from the module 2 and, thanks to the parallel connection of the outputs of the converters 3 and 4 (vA2=vB2=Vow), it is iA2>iB2. As a consequence, the input signal of the PI controller 10 is lower than zero (since k=−1), and, hence, the output signal vc(t) of the PI controller 10 is a decreasing function of time. On the basis of equations [1], [2] and [7], also dA(t), dB(t), M(dA(t)) and M(dB(t)) are decreasing functions of time. As a consequence, since the output voltage Vow is fixed, both voltages vA1=vA1' and vB1=vB1', given by the photovoltaic modules 1 and 2 are increasing functions of time. In other words, the operating points of both photovoltaic modules 1 and 2 move rightwards, towards the maximum power point.

It is immediate to verify that the case of the second situation ($v_{MPP} < vB1'' < vA1''$) is mutual to the first one, whereby the operating points of both photovoltaic modules 1 and 2 move leftwards, still towards the maximum power point.

The only possible balance situation is the third one ($vB1 < v_{MPP} < vA1$), wherein voltages vA1 and vB1 given by the photovoltaic modules 1 and 2 are such that powers extracted from these are equal ($P_A = P_B$), and wherein input of the PI controller 10 is almost equal to zero and, hence, quantities dA(t), dB(t), M(dA(t)), M(dA(t)), vA1 and vB1 are approximately constant.

It is evident that the choice of the sign of the value of the constant gain k of the amplifier 8 is related to equation [2]. In fact, if instead of the subtractor device 15 an adder device were employed (i.e., if the displacement Displacement were positive, instead of negative) and hence duty cycle dA(t) of the switches of the converter 3 were $$dA(t) = dB(t) + \Delta d \quad [2']$$

then, for a correct operation of the system of FIG. 1, the sign of the constant gain k of the amplifier 8 should be reversed, i.e. it should be:

$$k = +1$$

As far as the value of the constant $\Delta d$, i.e. the value of the modulus of the displacement Displacement, is concerned, in ideal balance conditions, the smaller the modulus $\Delta d$ of the displacement Displacement, the shorter is the distance of the operating point of each one of the two photovoltaic modules 1 and 2 from the maximum power point and, hence, the higher is the efficiency of MPPT tracking. However, in practical applications, due to the effects of tolerances of real components of the two switching photovoltaic sources A and B and to the effects of the small, yet unavoidable, differences of environmental conditions (e.g., temperature, humidity, etc.) which render the two switching photovoltaic sources A and B not perfectly equal, too small values of $\Delta d$ could lead to failure of MPPT tracking according to the invention.

The value of the modulus $\Delta d$ of the displacement Displacement does not only affect efficiency of MPPT tracking under steady conditions, but also the velocity of the whole tracking process (i.e. the velocity in reaching the maximum power point of the modules 1 and 2) in dynamic conditions. In fact, the larger the value of $\Delta d$, the higher is such velocity. Obviously, if the displacement were null (i.e. $\Delta d = 0$), in the case of two perfectly equal switching photovoltaic sources A and B such velocity would be equal to zero, in the sense that the system would not be capable to carry out the tracking process. Therefore, the choice of the value of $\Delta d$ must be made on the basis of a reasonable compromise between efficiency of MPPT tracking under steady conditions and dynamic performance of the MPPT system. Such value may be obtained on the basis of the analysis of the static conversion ratios M(dA(t)) and M(dB(t)) (affecting efficiency under steady conditions) of the used converters and of suitable transfer functions (affecting efficiency of MPPT tracking), as illustrated below.

Figure 4:
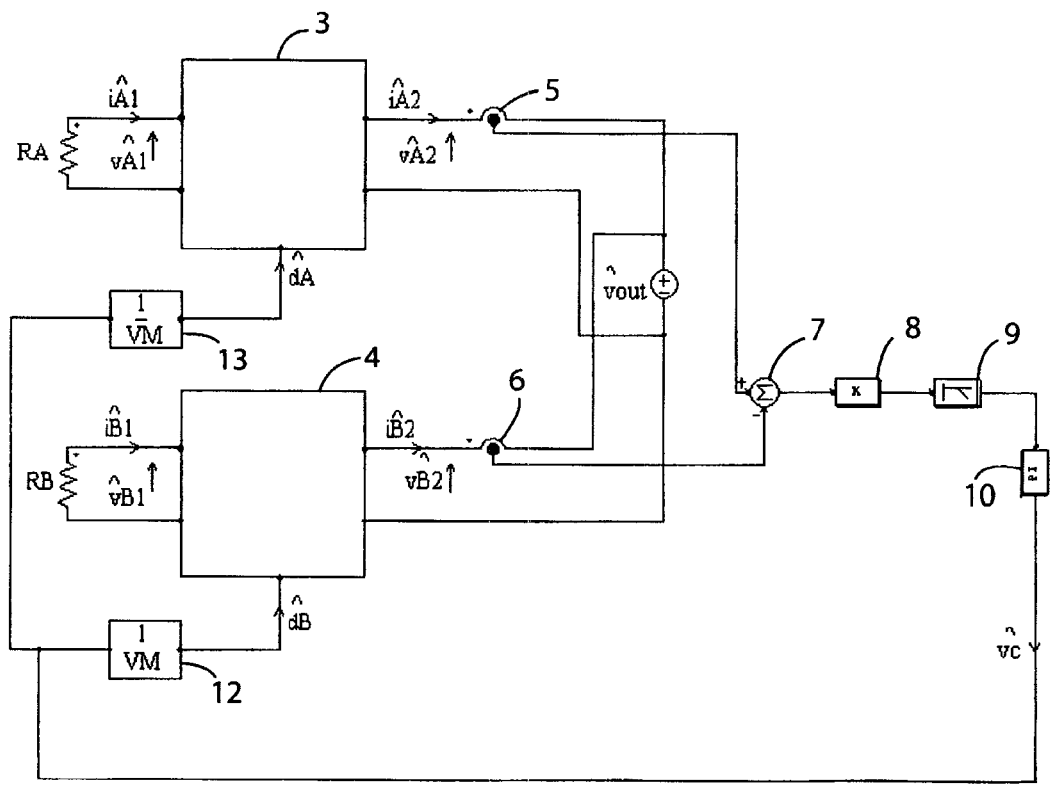
FIG. 4 shows a small signal representation of the system of FIG. 1.

As far as sizing of the very simple circuitry required by the controller apparatus according to the invention (comprising, in particular, a low-pass filter and a PI controller) is concerned, a small signal representation of the whole system of FIG. 1, immediately understandable by those skilled in the art, is shown in FIG. 4, where symbols with superimposed angle sign represent small signal variations about the values under steady conditions of the corresponding quantities.

The photovoltaic modules 1 and 2 di FIG. 1 are represented by resistors. In particular, as described by N. Femia, G. Petrone, G. Spagnuolo, and M. Vitelli in "*Optimization of perturb and observe maximum power point tracking method*", IEEE Trans. Power Electron., vol. 20, no. 4, pp. 963-973, July 2005, RA and RB are the absolute values of the differential resistances of the modules 1 and 2, respectively, equal to:

$$RA|_{VA1} = -\frac{\hat{v}A1}{\hat{i}A1}\bigg|_{VA1} \quad [9]$$

$$RB|_{VB1} = -\frac{\hat{v}B1}{\hat{i}B1}\bigg|_{VB1} \quad [10]$$

The values of RA and RB strongly depend on the operating point of the respective photovoltaic modules. In particular, at the maximum power point, it is:

$$RA|_{VMPP} = -\frac{\hat{v}A1}{\hat{i}A1}\bigg|_{MPP} = \frac{VMPP}{IMPP} \quad [11]$$

$$RB|_{VMPP} = -\frac{\hat{v}B1}{\hat{i}B1}\bigg|_{MPP} = \frac{VMPP}{IMPP} \quad [12]$$

where VMPP and IMPP are the values of voltage and current given by the modules at the maximum power point.

Figure 5:
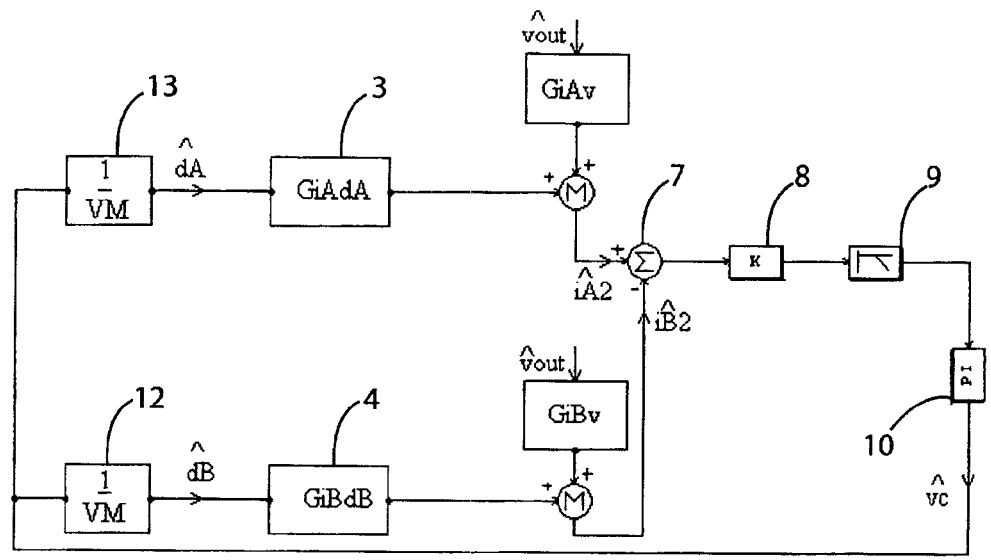
FIG. 5 shows an equivalent block diagram of the system represented in FIG. 4.

As described by R. W. Erickson and D. Maksimovic in "*Fundamental of Power Electronics*", Norwell, Mass.: Kluwer, 2001, the small signal model of the boost converter may be obtained by carrying out the average and linearising the equations of state of the same boost converter. The equivalent block diagram is shown in FIG. 5, wherein the transfer functions (in the Laplace domain) have the following expressions:

$$GiAv = \frac{\hat{i}A2}{\hat{v}out} = -\frac{\frac{(1-DA)^2}{RA}(1+s \cdot C_{in} \cdot RA)}{1 + \frac{s \cdot L}{RA} + s^2 \cdot L \cdot C_{in}} \quad [13]$$

$$GiBv = \frac{\hat{i}B2}{\hat{v}out} = -\frac{\frac{(1-DB)^2}{RB}(1+s \cdot C_{in} \cdot RB)}{1 + \frac{s \cdot L}{RB} + s^2 \cdot L \cdot C_{in}} \quad [14]$$

$$GiAdA = \frac{\hat{i}A2}{\hat{d}A} = \frac{\frac{Vout \cdot (1-DA)}{RA}\left(1 - \frac{s \cdot L}{(1-DA)^2 \cdot \frac{Vout^2}{PA}}\right)}{1 + \frac{s \cdot L}{RA} + s^2 \cdot L \cdot C_{in}} \quad [15]$$

$$GiBdB = \frac{\hat{i}B2}{\hat{d}B} = \frac{\frac{Vout \cdot (1-DB)}{RB}\left(1 - \frac{s \cdot L}{(1-DB)^2 \cdot \frac{Vout^2}{PB}}\right)}{1 + \frac{s \cdot L}{RB} + s^2 \cdot L \cdot C_{in}} \quad [16]$$

where:
- PA is the power extracted from the module 1 and PB is the power extracted from the module 2,
- L is the value of the inductance of the inductors with which the boost converters (indicated with 3 and 4 in FIG. 1) are provided,
- Cin is the value of the capacitance of the input capacitors with which the boost converters are provided, and
- DA and DB are the mean values of the duty cycles of the two boost converters.

The product of the constant gain k of the amplifier 8, of the transfer function LP(s) of the low-pass filter 9, of the transfer function PI(s) of the PI controller 10 and of the gain 1/VM of the modulator PWM is indicated with W(s):

$$W(s) = k \cdot \frac{1}{VM} \cdot LP(s) \cdot PI(s) \quad [17]$$

The closed loop transfer functions WiBv and WiAv of the two switching photovoltaic sources A and B represented in FIG. 5 are:

$$WiBv = \frac{\hat{i}B2}{\hat{v}} = \frac{GiBv + GiBv \cdot W \cdot (GiBdB - GiAdA) +}{1 + W \cdot (GiBdB - GiAdA)} \quad [18]$$
$$\phantom{WiBv} \frac{W \cdot GiBdB \cdot (GiAv - GiBv)}{1 + W \cdot (GiBdB - GiAdA)}$$
$$= \frac{GiBv + W \cdot GiBdB \cdot GiAv - GiBv \cdot W \cdot GiAdA}{1 + W \cdot (GiBdB - GiAdA)} =$$
$$= \frac{GiBv + W \cdot GiBdB \cdot GiAv - GiBv \cdot W \cdot GiAdA}{1 + T(s)}$$

$$WiAv = \frac{\hat{i}A2}{\hat{v}} = \frac{GiAv + GiAv \cdot W \cdot (GiBdB - GiAdA) +}{1 + W \cdot (GiBdB - GiAdA)} \quad [19]$$
$$\phantom{WiAv} \frac{W \cdot GiAdA \cdot (GiAv - GiBv)}{1 + W \cdot (GiBdB - GiAdA)}$$
$$= \frac{GiAv + W \cdot GiBdB \cdot GiAv - GiBv \cdot W \cdot GiAdA}{1 + W \cdot (GiBdB - GiAdA)} =$$
$$= \frac{GiBv + W \cdot GiBdB \cdot GiAv - GiBv \cdot W \cdot GiAdA}{1 + T(s)}$$

In order to make the closed loop system stable, with an adequate phase margin and a sufficiently high crossover frequency, the transfer function LP(s)*PI(s) must satisfy certain constraints. In this regard, in order to ensure system stability, the phase margin test (described by R. W. Erickson and D. Maksimovic in "*Fundamental of Power Electronics*", Norwell, Mass.: Kluwer, 2001) may be applied to the quantity T(s) appearing in denominator of both the closed loop transfer functions [18] and [19]. This entails that, in order that the closed loop transfer functions [18] and [19] do not contain any pole in the right half-plane of the Laplace domain (ensuring system stability), the phase margin of the quantity $$T(s) = W(s) \cdot (GiBdB - GiAdA) \quad [20]$$

must be positive.

Other embodiments of the controller apparatus according to the invention may comprise, instead of the PI controller, a Proportional-Integral-Derivative (or PID) controller, that allows an improvement of the phase margin.

The system illustrated so far is a stand-alone system. However, it must be understood that, as already said above, that the invention is also applicable to grid-connected photovoltaic systems.

Figure 6:
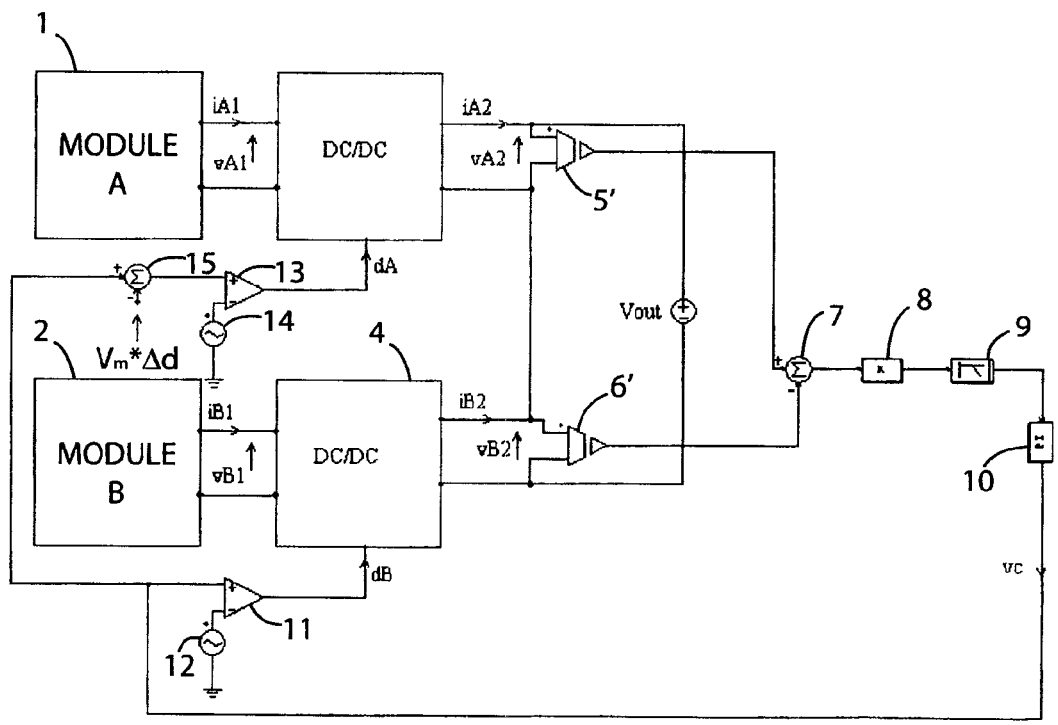
FIG. 6 shows a schematic block diagram of an alternative preferred embodiment of the electric power generation system according to the invention.

Other embodiments of the system according to the invention may provide a mutual configuration of the connections between the switching photovoltaic sources A and B, with respect to the one shown in FIG. 1. In this case, as shown in FIG. 6, the output nodes of the converters 3 and 4 are connected in series, and the electrical quantities detected by corresponding sensors 5' and 6' are the output voltages vA2 and vB2, the output voltage Vout given by the two switching photovoltaic sources A and B is equal to the sum of the single output voltages (Vout=vA2+vB2), whereas the output currents are equal (iA2=iB2=iout). In this case, the subtractor device 7 would give to the amplifier 8 the difference signal between the two detected signals of the voltages vA2 and vB2. The operation principle of the system would remain unchanged, whereas sizing of the control circuitry will be carried out on the basis of the mutuality principle, i.e. by replacing voltages with currents and vice versa, and by considering the transfer functions as functions of voltages instead of the transfer functions as functions of currents.

The inventors have carried out some simulations of the system of FIG. 1 for checking its performance. In particular, in order to demonstrate the high performance obtainable through the invention, the Perturb & Observe, or P&O, technique described by N. Femia, G. Petrone, G. Spagnuolo, and M. Vitelli in "*Optimization of perturb and observe maximum power point tracking method*", IEEE Trans. Power Electron., vol. 20, no. 4, pp. 963-973, July 2005, and by N. Femia, D. Granozio, G. Petrone, G. Spagnuolo, and M. Vitelli in "A predictive and adaptive MPPT perturb and observe method", IEEE Trans. Aerosp. Electron. Syst., vol. 43, no. 3, pp. 934-950, July 2007, has been used as reference technique. Such P&O technique, as said before, is easily implementable and, if properly designed, is capable to lead to very high values of MPPT efficiency. In this regard, in the simulations of both systems, both the controller apparatus according to the invention and the controller apparatus operating according to the P&O technique have been optimised, in order to render their comparison significant. Therefore, the parameters of the system of FIG. 1 are chosen as previously discussed, whereas the two parameters involved in the application of the P&O technique (i.e. the amplitude $\Delta d_{P\&O}$ of the duty cycle perturbation and the time interval Ta between two consecutive duty cycle perturbations) have been chosen as explained by N. Femia, G. Petrone, G. Spagnuolo, and M. Vitelli in "*Optimization of perturb and observe maximum power point tracking method*", IEEE Trans. Power Electron., vol. 20, no. 4, pp. 963-973, July 2005. In particular, for such parameters, the following sets of values have been chosen:

for the system of FIG. 1: $\Delta d=0.02$; VM=1; LP(s)=1/(1+s*1.4/6280+s^2/6280^2); PI(s)=(1+s*5*10^{-5})/(s*5*10^{-7});

for the P&O system: Ta=4 ms; $\Delta d_{P\&O}=0.02$.

The value of the modulus $\Delta d$ of the negative displacement Displacement has been chosen equal to the value of the perturbation amplitude $\Delta d_{P\&O}$ so that, under steady conditions, if such value ($\Delta d=\Delta d_{P\&O}$) is rather small, the two systems should approximately give the same values of efficiency of MPPT tracking.

Actually, as described in the just mentioned paper by Femia et al., with a properly sized P&O system, under steady conditions, the operating voltage of a given photovoltaic source oscillates by assuming only three different values located in the proximity of the voltage $v_{MPP}$ corresponding to the maximum power point: the voltage vL on the left of the maximum power point (vL=$v_{MPP}$−vout−$\Delta d_{P\&O}$), the voltage vC≈$v_{MPP}$, and the voltage vR on the right of the maximum power point (vR=$v_{MPP}$+vout·$\Delta d_{P\&O}$), where vL<vC<vR.

In the system according to the invention di FIG. 1, under steady conditions, the operating voltage of each photovoltaic module 1 and 2 is located in the proximity of the voltage $v_{MPP}$ corresponding to the maximum power point, so that $vA1 \approx v_{MPP} + vout \cdot \Delta d/2$ and $vB1 \approx v_{MPP} - vout \cdot \Delta d/2$.

Therefore, from the point of view of the efficiency, the fact that the voltages vA and vB given by the two photovoltaic modules 1 and 2 in the system of FIG. 1 are closer to the voltage $v_{MPP}$ corresponding to the maximum power point with respect to the voltages vL and vR of the P&O system is more or less compensated by the fact that in the P&O technique a third operating point exists that is approximately coinciding with the maximum power point.

In this regard, the photovoltaic modules considered in the simulations are Sunmodule SW225 poly modules made of 60 cells 156*156 $mm^2$ of polycrystalline silicon. The electrical characteristics of such modules in Standard Test Conditions, i.e. for sunlight level S equal to 1000 $W/m^2$, cell temperature equal to 25° C., and air mass (AM) equal to 1.5, are as follows:
open circuit voltage $V_{oc}$=36.8 V,
short circuit current $I_{sc}$=8.17 A,
maximum power point voltage $V_{MPP}$=29.5 V,
maximum power point current $i_{MPP}$=7.63 A,
nominal operating cell temperatures NOCT=46° C.

In the simulation, a fixed mean value of room temperature Tamb, equal to 25° C., has been considered. Moreover, the circuit and boost converter operation parameters (identical for the system of FIG. 1 and for the P&O system) are the following: output inductance L=180 µH, output voltage Vout=40 V, switching frequency fs=50 kHz, and input capacitance Cin=120 µF.

Figure 7:
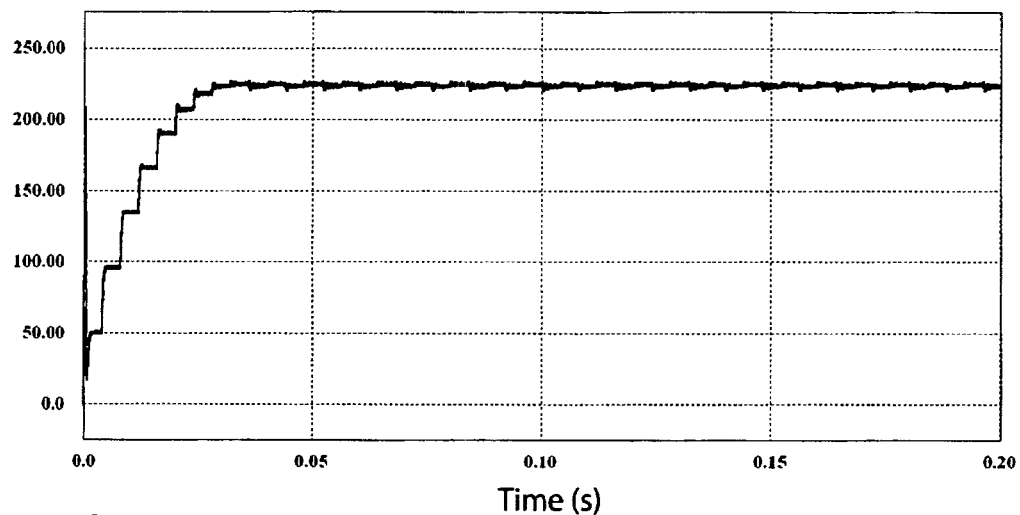
Figure 7:
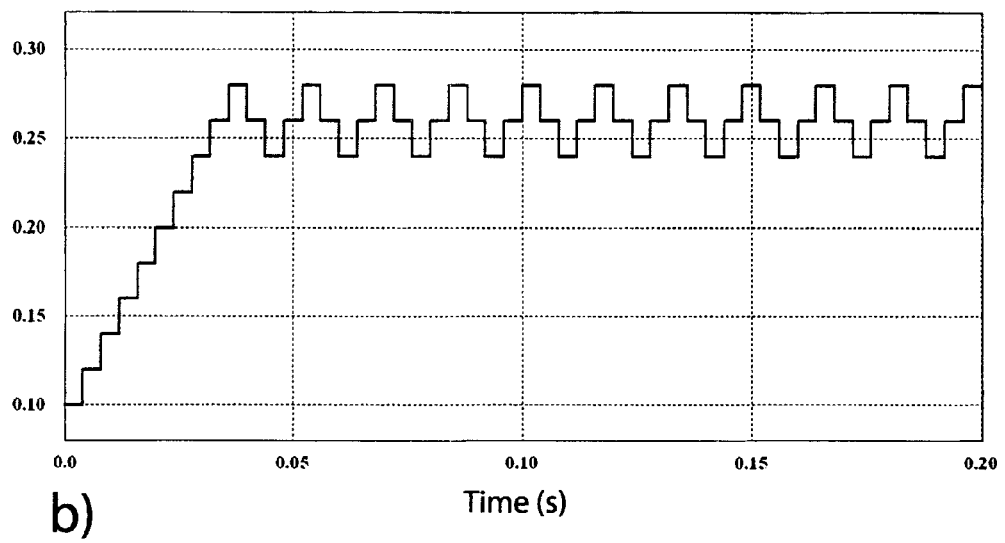

In FIG. 7, the numerical results of the simulations of the P&O system are shown. FIG. 7a represents the time domain behaviour of the power extracted from the photovoltaic module in stable atmospheric conditions (S=1000 $W/m^2$, Tamb=25° C.), during the boost converter power up transient until steady conditions are reached. Differently, FIG. 7b shows the corresponding time domain behaviour of the duty cycle of the boost converter switches.

Figure 8:
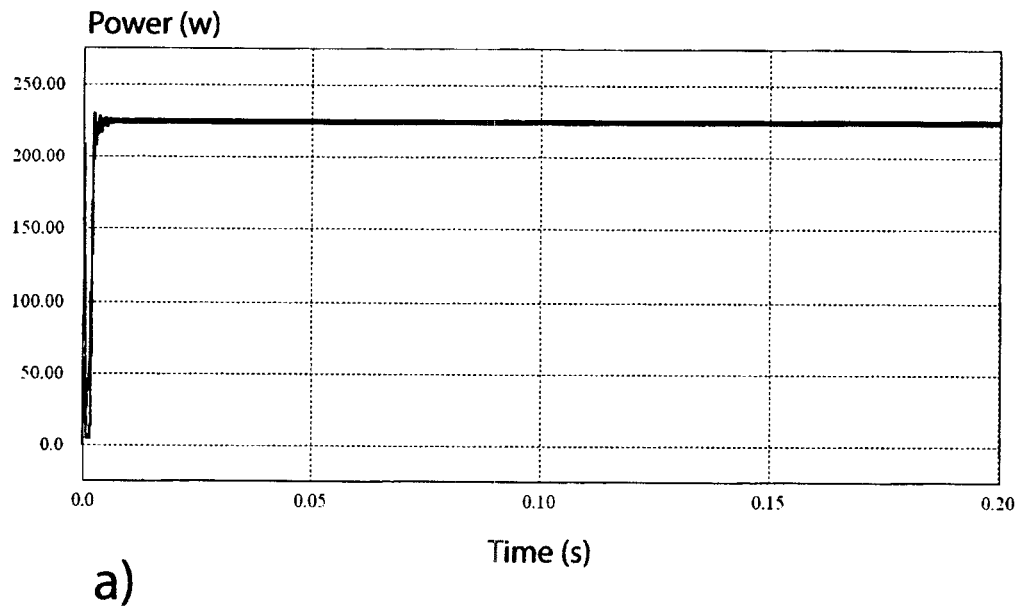
FIG. 8 shows the numerical results of simulations on the system of FIG. 1 related to the extracted power (FIG. 8a) and duty cycle (FIG. 8b) of each converter.
Figure 8:
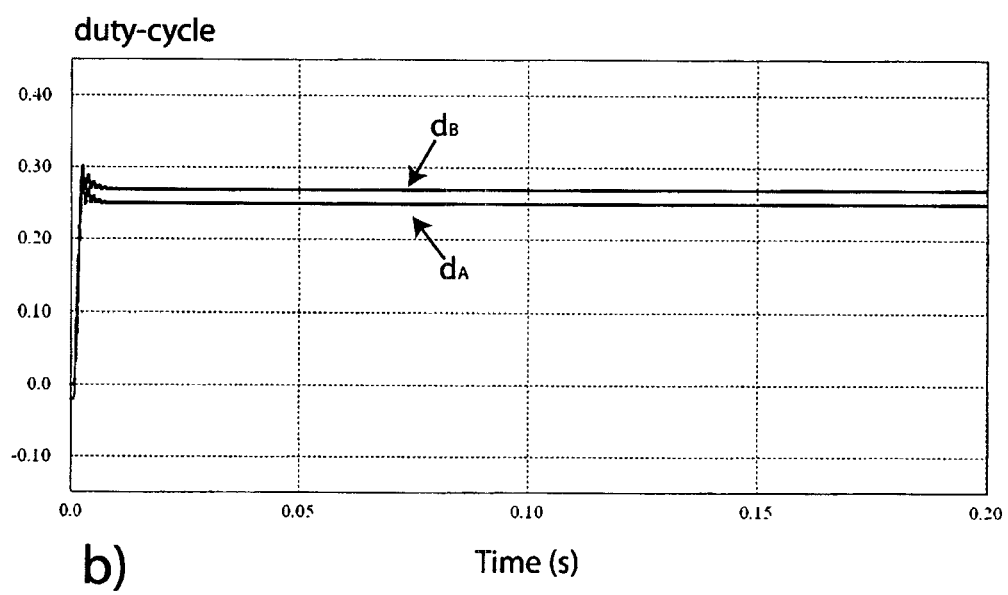

The graph shown in FIG. 8 refer to the corresponding quantities for the system of FIG. 1. Actually, FIGS. 8a and 8b show the extracted power and the duty cycle for both the switching photovoltaic sources A and B, even if the waveforms of FIG. 8a are not easily distinguishable, since they are substantially superimposed.

By examining FIGS. 7 and 8, it is evident that both the system of FIG. 1 and the P&O system are capable to lead, under steady conditions, to a power extracted from each module very close to the maximum power $P_{MMP}$=225 W. However, by comparing such Figures, the higher tracking velocity of the system of FIG. 1 is further evident. This aspect represents a further advantage offered by the invention with respect to prior art MPPT tracking techniques.

Figure 9:
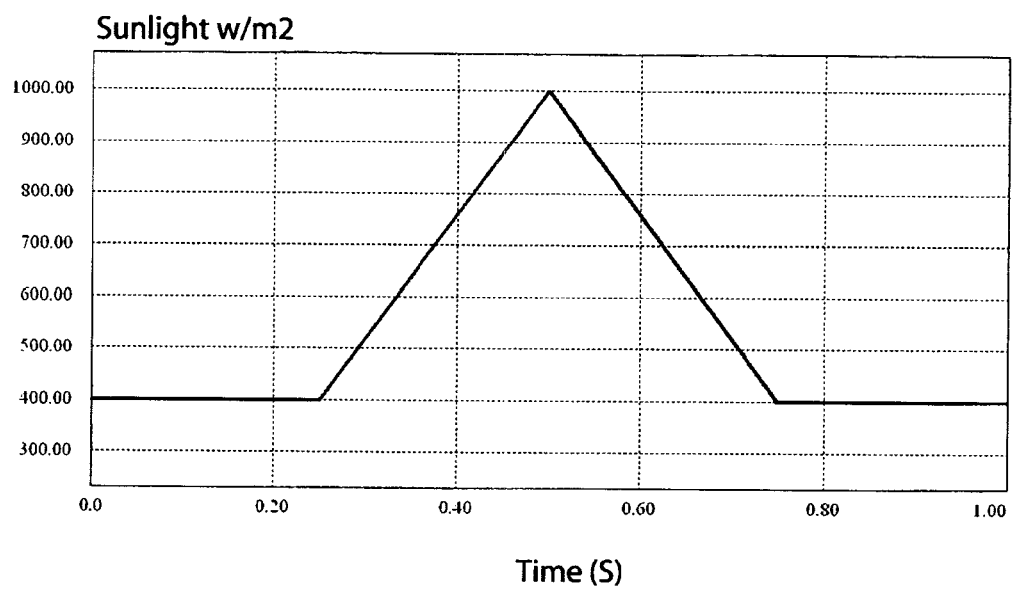
FIG. 9 shows a varying behaviour of the sunlight level S used in simulations carried out on the prior art reference system and on the system of FIG. 1.

Further numerical simulations have been carried out by taking time variable atmospheric conditions into account. In particular, by way of example, the behaviour of the sunlight level S shown in FIG. 9 has been considered.

Figure 10:
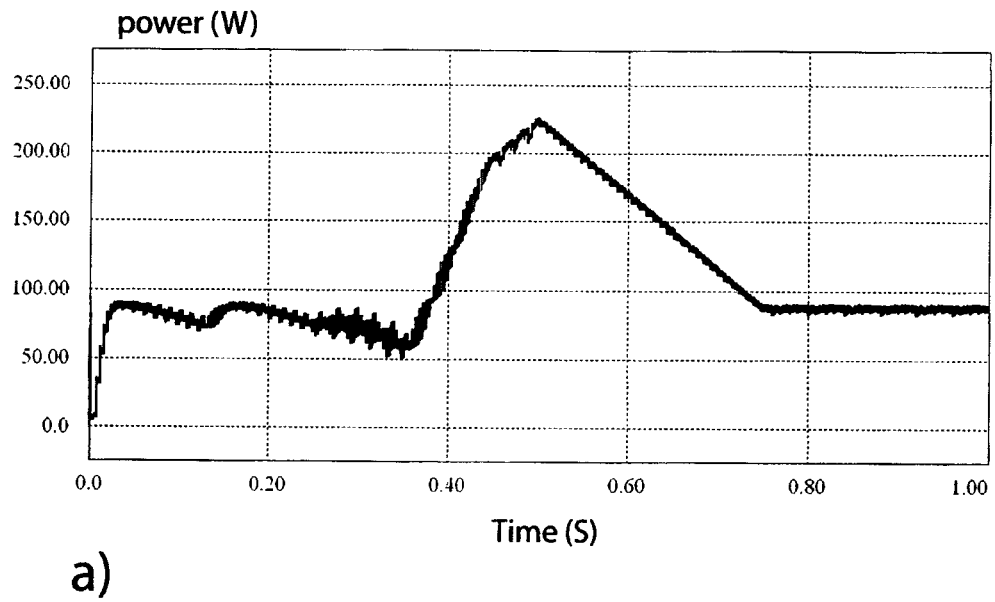
FIG. 10 shows the numerical results of simulations, under the sunlight conditions of FIG. 9, related to the behaviour of the power extracted from the photovoltaic module (FIG. 10a) and to the corresponding behaviour of the duty cycle of the boost converter switches (FIG. 10b) of the prior art reference system.
Figure 10:
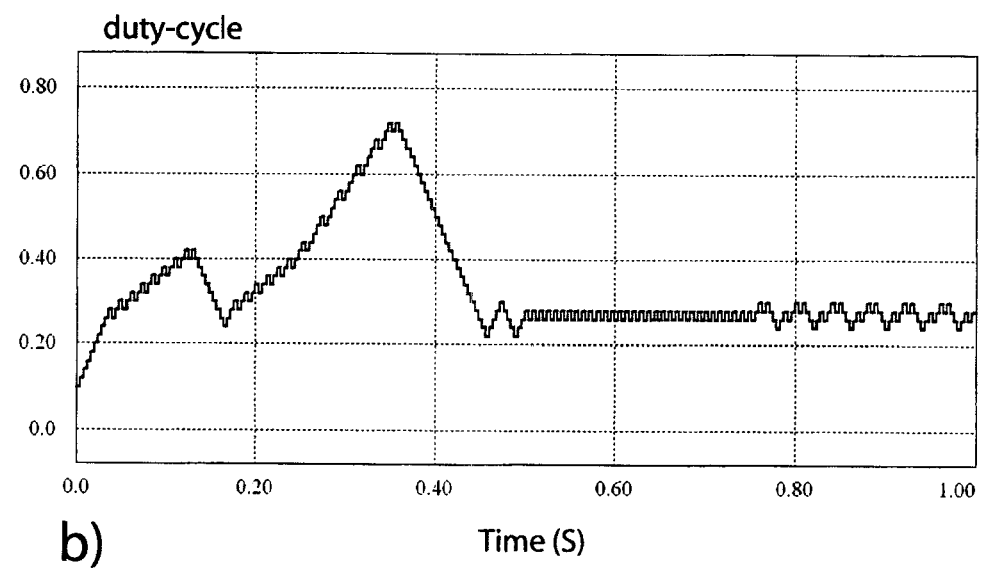

In FIG. 10 the numerical results obtained through the P&O system are shown. In particular, FIG. 10a shows the behaviour of the power extracted from the photovoltaic module, whereas FIG. 10b shows the corresponding behaviour of the duty cycle of the boost converter switches.

Figure 11:
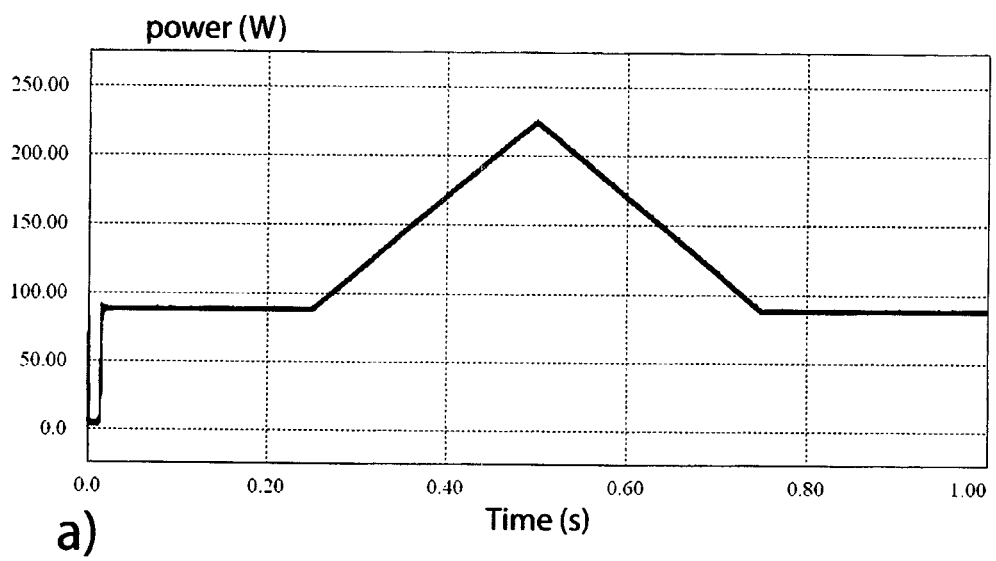
FIG. 11 shows the numerical results of simulations, under the sunlight conditions of FIG. 9, related to the extracted power (FIG. 11a) and duty cycle (FIG. 11b) of each converter of the system di FIG. 1.
Figure 11:
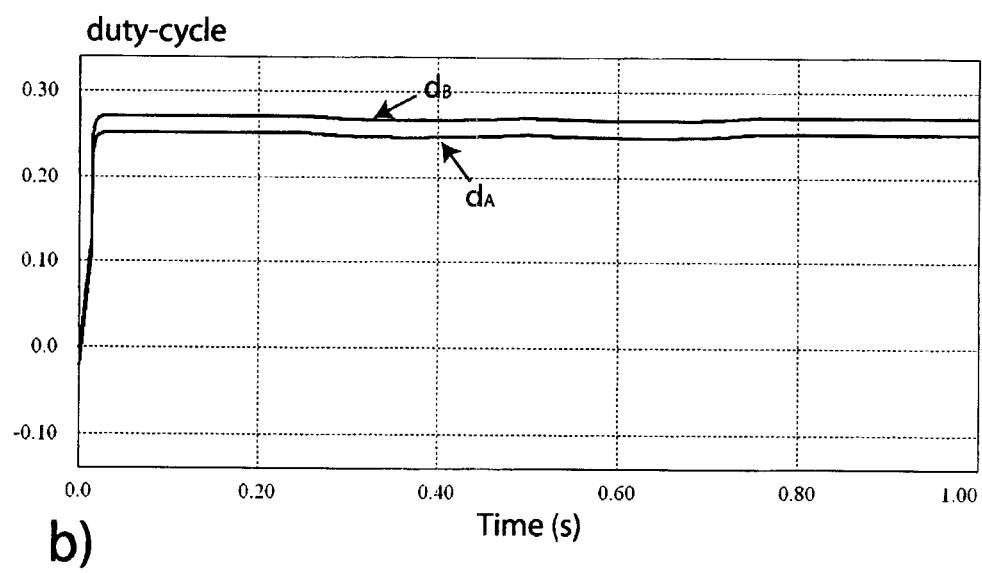

Differently, the graphs shown in FIG. 11 refer to the corresponding waveforms obtained with the system of FIG. 1. Also in FIGS. 11a and 11b the extracted power and the duty cycle for both the switching photovoltaic sources A and B are actually shown, even if the two waveforms of FIG. 11a are not easily distinguishable, since they are substantially superimposed.

Figure 12:
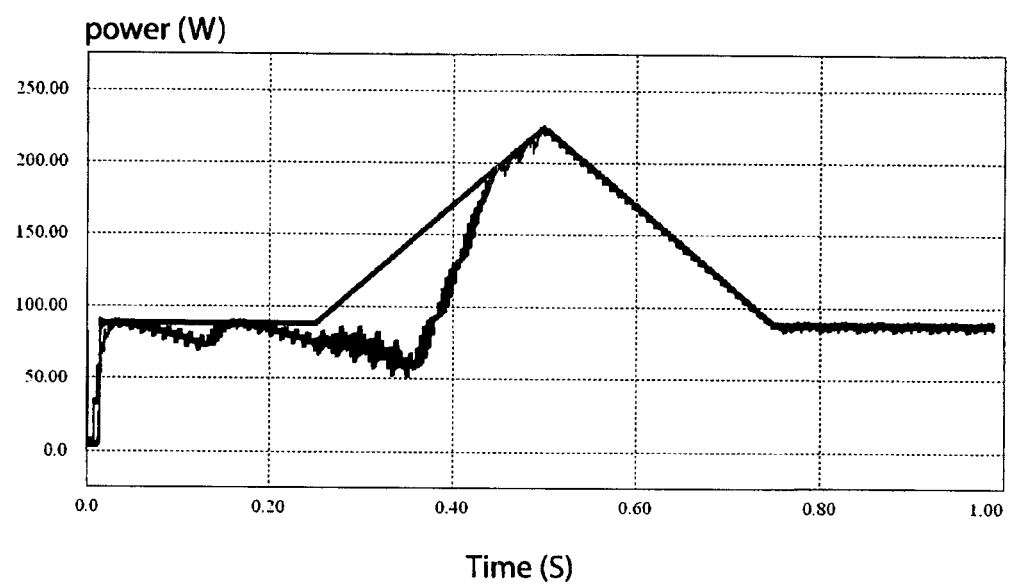

FIG. 12 shows a comparison of the time domain behaviour of the powers extracted from the photovoltaic modules as shown in FIGS. 10a and 11a. Such comparison clearly highlights the higher tracking velocity obtained through the system of FIG. 1 with respect to the P&O system.

Figure 13:
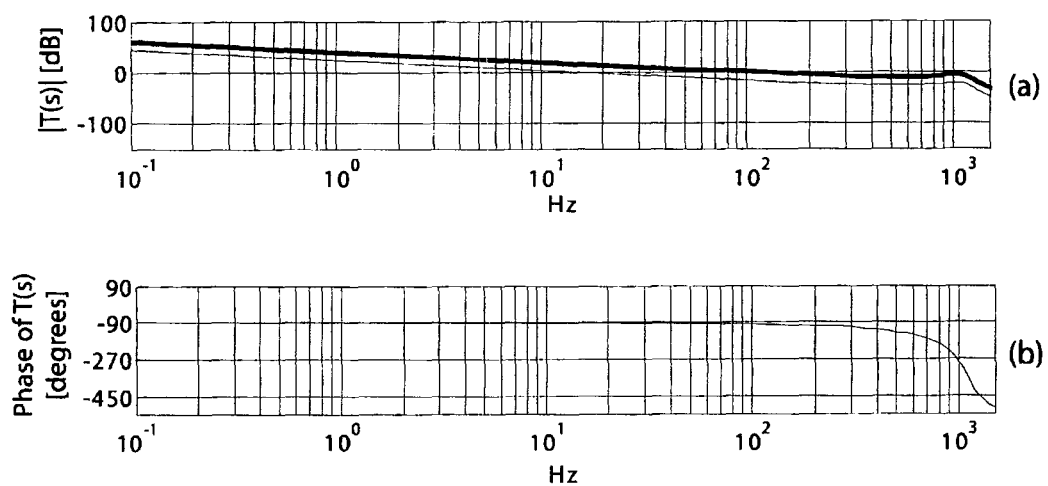
FIG. 13 shows the Bode plots of amplitude (FIG. 13a) and phase (FIG. 13b) for two values of Δd of a quantity appearing as summand in denominator of the two closed loop transfer functions of the system of FIG. 1.

As said before, the larger the value of the modulus $\Delta d$ of the displacement Displacement, the higher is the velocity of the MPPT tracking process. In this regard, FIG. 13 shows the Bode plots of amplitude (FIG. 13a) and phase (FIG. 13b) of the quantity T(s) represented by equation [20] in two cases: for a modulus $\Delta d$=0.02 (thick line), and for a modulus $\Delta d$=0.002 (thin line). As shown in FIG. 13b, the value of the modulus $\Delta d$ of the displacement Displacement has a neglectable effect on the phase plots (which are approximately coinciding). However, as shown in FIG. 13a, the variation of the value of the displacement modulus $\Delta d$ causes an evident variation of the crossover frequency in the amplitude plots: the larger the value of the displacement modulus $\Delta d$, the higher will be the crossover frequency and, as a consequence, the shorter will be the system response time.

Although it may be implemented also with digital circuitry, however it deserves to be highlighted once more that the controller apparatus according to the invention may be advantageously implemented with purely analog circuitry.

The present invention has been described, by way of illustration and not by way of limitation, according its' preferred embodiments, but it should be understood that those skilled in the art can make variations and/or changes, without so departing from the related scope of protection, as defined by the enclosed claims.

The invention claimed is:

1. A system comprising a controller apparatus with maximum power point tracking, or MPPT, and an electric power generation system based on photovoltaic sources, the controller apparatus controlling the electric power generation system, the electric power generation system comprising two identical sections of a photovoltaic field, connected to two respective identical power converters with direct current input, each converter comprising switching means capable to periodically connect the input to the output of the same converter, the two converters being controlled by two respective periodic signals for controlling the switching means which are generated by the controller apparatus, the output of each converter being capable to provide a respective pair of output electrical quantities consisting of an output voltage and an output current, the outputs of the two converters being connected in such a configuration to have an identical first output electrical quantity selected from said respective pair of output electrical quantities, wherein the controller apparatus comprises:

a first sensor for detecting a second output electrical quantity selected from the pair of output electrical quantities of a first one of said two converters, for giving a first detection signal, a second sensor for detecting a second output electrical quantity selected from the pair of output electrical quantities of a second one of said two converters, for giving a second detection signal, subtractor means capable to receive said first and second detection signals and to generate a difference signal between the second output electrical quantity of the first converter and the second output electrical quantity of the second converter, amplifier means capable to receive said difference signal and to amplify the same by a constant gain k, outputting an amplified difference signal, low-pass filter means capable to receive and to filter said amplified difference signal, for outputting a filtered amplified difference signal, controller means capable to receive said filtered amplified difference signal and to carry out a proportional action and an integral action on the same, for outputting a processed signal vc(t), first generator means capable to receive said processed signal vc(t) and to generate a first one of said two controlling periodic signals having an instant duty cycle dB(t) proportional to said processed signal vc(t) by a constant equal to 1/VM, whereby $$dB(t) = \frac{vc(t)}{VM}$$

for outputting said first controlling periodic signal capable to control the second converter, adder means capable to receive said processed signal and to add to it a constant displacement (Displacement) having modulus VM*Δd, with Δd ranging from 0 to 1:

$$0 < \Delta d < 1,$$

for outputting a displaced processed signal, and second generator means capable to receive said displaced processed signal and to generate a second one of said two controlling periodic signals having an instant duty cycle dA(t) proportional to said displaced processed signal, for outputting said second controlling periodic signal capable to control the first converter, said constant gain k and said constant displacement (Displacement) having the same sign.

2. The system according to claim 1, wherein said controller means are further capable to carry out a derivative action on said filtered amplified difference signal.

3. The system according to claim 2, wherein said first generator means comprises first pulse width modulator (PWM) means, preferably comprising first comparator means having a non-inverting input, capable to receive said processed signal, and an inverting input, capable to receive a periodic signal with sawtooth waveform the peak amplitude of which is VM and that is generated by a corresponding generator, said first comparator means giving said first controlling periodic signal.

4. The system according to claim 3, wherein said second generator means comprises second pulse width modulator (PWM) means, preferably comprising second comparator means having a non-inverting input, capable to receive said displaced processed signal, and an inverting input, capable to receive a periodic signal with sawtooth waveform the peak amplitude of which is VM and it is generated by a corresponding generator, said second comparator means giving said first controlling periodic signal.

5. The system according to claim 2, wherein said second generator means comprises second pulse width modulator (PWM) means, preferably comprising second comparator means having a non-inverting input, capable to receive said displaced processed signal, and an inverting input, capable to receive a periodic signal with sawtooth waveform the peak amplitude of which is VM and it is generated by a corresponding generator, said second comparator means giving said first controlling periodic signal.

6. The system according to claim 2, wherein the outputs of the two converters are connected in series, so as to have an identical output current, whereby:

said first output electrical quantity of the two converters is the respective output current, said second output electrical quantity of the first one of said two converters is the output voltage of the first one of said two converters, said second output electrical quantity of the second one of said two converters is the output voltage of the second one of said two converters, the first sensor detecting the output voltage of the first one of said two converters, and the second sensor detecting the output voltage of the second one of said two converters.

7. The system according to claim 1, wherein said first generator means comprises first pulse width modulator (PWM) means, preferably comprising first comparator means having a non-inverting input, capable to receive said processed signal, and an inverting input, capable to receive a periodic signal with sawtooth waveform the peak amplitude of which is VM and that is generated by a corresponding generator, said first comparator means giving said first controlling periodic signal.

8. The system according to claim 7, wherein said second generator means comprises second pulse width modulator (PWM) means, preferably comprising second comparator means having a non-inverting input, capable to receive said displaced processed signal, and an inverting input, capable to receive a periodic signal with sawtooth waveform the peak amplitude of which is VM and it is generated by a corresponding generator, said second comparator means giving said first controlling periodic signal.

9. The system according to claim 1, wherein said second generator means comprises second pulse width modulator (PWM) means, preferably comprising second comparator means having a non-inverting input, capable to receive said displaced processed signal, and an inverting input, capable to receive a periodic signal with sawtooth waveform the peak amplitude of which is VM and it is generated by a corresponding generator, said second comparator means giving said first controlling periodic signal.

10. The system according to claim 1, wherein the outputs of the two converters are connected in parallel, so as to have an identical output voltage, whereby:

said first output electrical quantity of the two converters is the respective output voltage, said second output electrical quantity of the first one of said two converters is the output current of the first one of said two converters, said second output electrical quantity of the second one of said two converters is the output current of the second one of said two converters, the first sensor detecting the output current of the first one of said two converters, and the second sensor detecting the output current of the second one of said two converters.

11. The system according to claim 1, wherein the outputs of the two converters are connected in series, so as to have an identical output current, whereby:

said first output electrical quantity of the two converters is the respective output current, said second output electrical quantity of the first one of said two converters is the output voltage of the first one of said two converters, said second output electrical quantity of the second one of said two converters is the output voltage of the second one of said two converters, the first sensor detecting the output voltage of the first one of said two converters, and the second sensor detecting the output voltage of the second one of said two converters.

12. The system according to claim 1, wherein each one of said two identical sections comprises a photovoltaic module.

13. The system according to claim 1, wherein it is stand-alone.

14. The system according to claim 1, wherein said two power converters have direct current output, said two converters being preferably boost converters, more preferably with continuous conduction operation mode or CCM (Continuous Conduction Mode).

15. The system according to claim 1, wherein it is connected to an electric energy distribution network, said two power converters having alternate current output.

16. A controlling method with MPPT tracking for controlling an electric power generation system based on photovoltaic sources, the system comprising two identical sections of a photovoltaic field, connected to two respective identical power converters with direct current input, each converter comprising switching means capable to periodically connect the input to the output of the same converter, the two converters being controlled by two respective periodic signals for controlling the switching means, the output of each converter providing a respective pair of output electrical quantities consisting of an output voltage and an output current, the outputs of the two converters being connected in such a configuration to have an identical first output electrical quantity selected from said respective pair of output electrical quantities, the method being wherein it further comprises the following steps:

A. detecting a second output electrical quantity selected from the pair of output electrical quantities of a first one of said two converters, obtaining a first detection signal, B. detecting a second output electrical quantity selected from the pair of output electrical quantities of a second one of said two converters, obtaining a second detection signal, C. generating a difference signal between the second output electrical quantity of the first converter and the second output electrical quantity of the second converter on the basis of said first and second current detection signals, D. amplifying said difference signal by a constant gain k, obtaining an amplified difference signal, E. filtering said amplified difference signal, obtaining a filtered amplified difference signal, F. carrying out a proportional action and an integral action on said filtered amplified difference signal, obtaining a processed signal vc(t), G. generating a first one of said two controlling periodic signals having an instant duty cycle dB(t) proportional to said processed signal vc(t) by a constant equal to 1/VM, whereby $$dB(t) = \frac{vc(t)}{VM}$$

obtaining said first controlling periodic signal capable to control the second converter, H. adding to said processed signal a constant displacement (Displacement) having modulus VM*Δd, with Δd ranging from 0 to 1:

$$0 < \Delta d < 1,$$

obtaining a displaced processed signal, and

I. generating a second one of said two controlling periodic signals having an instant duty cycle dA(t) proportional to said displaced processed signal, obtaining said second controlling periodic signal capable to control the first converter, said constant gain k and said constant displacement (Displacement) having the same sign.

17. The method according to claim 16, wherein step F further carries out a derivative action on said filtered amplified difference signal.

18. The method according to claim 16, wherein the outputs of the two converters are connected in parallel, so as to have an identical output voltage, whereby:
said first output electrical quantity of the two converters is the respective output voltage,
said second output electrical quantity of the first one of said two converters is the output current of the first one of said two converters,
said second output electrical quantity of the second one of said two converters is the output current of the second one of said two converters,
the method detects in step A the output current of the first one of said two converters, and
the method detects in step B the output current of the second one of said two converters.

19. The method according to claim 16, wherein the outputs of the two converters are connected in series, so as to have an identical output current, whereby:
said first output electrical quantity of the two converters is the respective output current,
said second output electrical quantity of the first one of said two converters is the output voltage of the first one of said two converters
said second output electrical quantity of the second one of said two converters is the output voltage of the second one of said two converters,
the method detects in step A the output voltage of the first one of said two converters, and
the method detects in step B the output voltage of the second one of said two converters.

* * * * *